United States Patent [19]

Kuroda et al.

[11] 4,357,385

[45] Nov. 2, 1982

[54] FILAMENTARY YARN USEFUL FOR THE WEFT COMPONENT OF A TIRE CORD FABRIC AND A TIRE CORD FABRIC INCLUDING SUCH A YARN

[75] Inventors: Toshimasa Kuroda; Seiji Ishii, both of Takatsuki; Shiro Kumakawa; Koh-ichi Iohara, both of Ibaraki, all of Japan

[73] Assignee: Teijin Limited, Osaka, Japan

[21] Appl. No.: 159,277

[22] Filed: Jun. 13, 1980

[30] Foreign Application Priority Data

Jun. 15, 1979 [JP] Japan .................................. 54-74580

[51] Int. Cl.³ ...................... B60C 9/00; D03D 15/00; B32B 27/36; D01F 6/92
[52] U.S. Cl. .................................... 428/229; 428/395; 152/358; 152/359; 156/110 C; 57/902; 525/439; 525/444; 139/420 A; 260/45.7 R; 260/45.8 R
[58] Field of Search .................. 152/357 R, 358, 359, 152/330 R; 156/110 C; 57/902; 428/225, 229, 395; 260/45.7 R, 45.8 R; 525/439, 444

[56] References Cited

U.S. PATENT DOCUMENTS 3,563,847  2/1971  Rye et al. ............................ 152/359
4,196,763  4/1980  Imamura ............................. 152/358

*Primary Examiner*—Edward C. Kimlin
*Assistant Examiner*—Lois E. Boland
*Attorney, Agent, or Firm*—Sughrue, Mion, Zinn, Macpeak & Seas

[57] ABSTRACT

A thermally improved polyester weft yarn is provided by melt-spinning a blend of a polyethylene terephthalate polymer and a small amount of polymer having a glass transition temperature of at least 10° C. higher than that of the polyethylene terephthalate polymer. The yarn has a break elongation of 70% to 200% and a dry heat shrinkage of +5% to −2%, and is capable of withstanding a severe heat-treatment, for example, at 245° C. for 2 minutes during dipping and curing process of a tire cord fabric comprising the same. Even after such heat-treatment, the yarn shows a residual break elongation of more than 60%. Thus, the weft yarn extends uniformly, without breakage, to a toroidal shape during a tire building process, keeping warp cords at a equi-distance relation. A tire cord fabric comprising the weft yarn of the invention finds its use as the carcass in the form of single ply in a radial tire.

11 Claims, 1 Drawing Figure

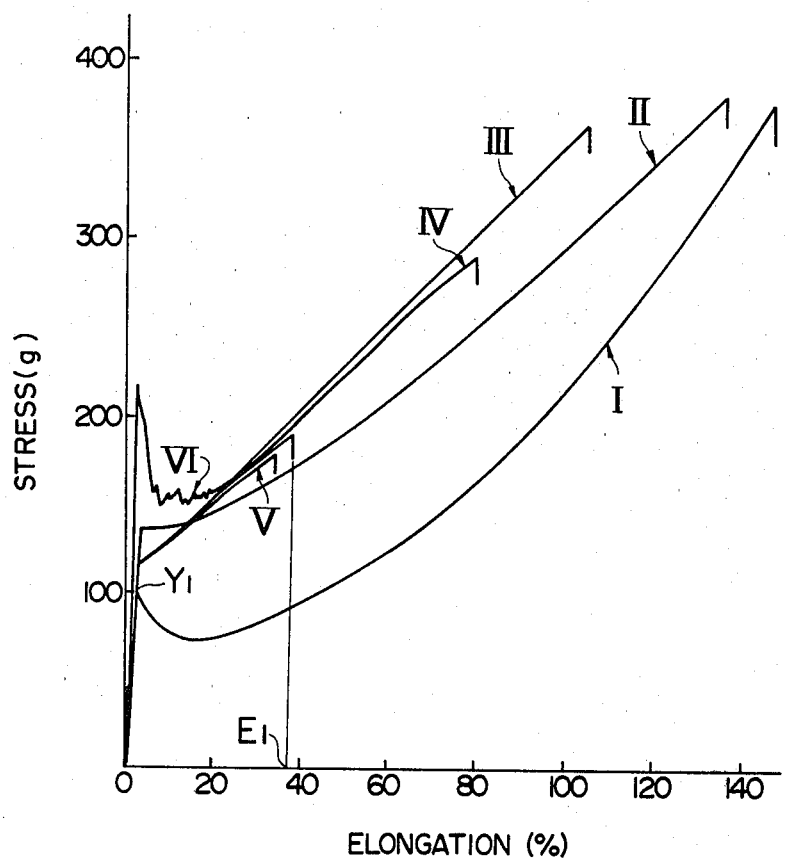

FILAMENTARY YARN USEFUL FOR THE WEFT COMPONENT OF A TIRE CORD FABRIC AND A TIRE CORD FABRIC INCLUDING SUCH A YARN

BACKGROUND OF THE INVENTION

This invention relates to a filamentary yarn useful for the weft component of a tire cord fabric and also to a tire cord fabric including such a yarn. More specifically this invention relates to a filamentary yarn being extendable uniformly and continuously during a tire building, especially during expansion of a carcass which comprises said yarn as the weft component of a tire cord fabric.

Heretofore, cotton yarns have been mainly used as the weft yarns in a tire cord fabric. But those skilled in the art have been keenly aware that cotton yarns raise various problems due to their excessive variation in strength and also their comparatively low extensibility. A typical example of these problems is the non-uniformity of a finished tire caused by uneven breakage of the weft yarns during expansion of a carcass by 60% to 80% to a toroidal shape during the building and vulcanizing to the tire.

To overcome these defects, Wolf et al. U.S. Pat. No. 3,395,744. suggests the adaptation, as the weft yarns in tire cord fabrics, of synthetic organic filaments in at least a partially unoriented state, having a high break elongation of at least 50%. Another proposal is made by Glass et al., U.S. Pat. No. 3,677,318, in which synthetic organic filaments having a high elongation of at least 80% are covered with cotton fibres, and these core spun yarns, when used as weft yarns, show an improved processing ability, especially in their even extensibility during the tire building process.

It seems that two proposals render satisfactory results as far as the prevention of breakage of the weft filaments is concerned. However, other important problems have been left unsolved. For example, filaments having a high break elongation of at least 50% which are in an undrawn state or in a transient state between the undrawn state and fully drawn state show an extremely unstable thermal property. Thus, a tire cord fabric comprising the above mentioned filaments has poor dimensional stability even at ambient temperature. Furthermore, when the fabric is subjected to a heat treatment, for example, the curing process of a resorcinol-formaldehyde-latex applied thereto at a temperature more than 240° C., the weft filaments in the fabric become frail, losing their original extensibility.

BRIEF DESCRIPTION OF THE DRAWING

The accompanying drawing explains stress-strain curves of various filamentary yarns of the different thermal memories, wherein.

The curve I is a stress-strain curve of a partially oriented yarn (150 de/36 fil.) having a break elongation of 140% and bi-refringence value of 0.035;

The curve II is a stress-strain curve of the yarn after it has been steam-set at 135° C. for 30 minutes for the purpose of improving its thermal stability;

The curve III is a stress-strain curve of the steam-set yarn after it has been further heat (dry-heat)-set at 230° C. for 2 minutes;

The curve VI is a stress-strain curve of the steam-set yarn after it has been further heat (dry heat)-set at 240° C. for 2 minutes;

The curve V is a stress-strain curve of the steam-set yarn after it has been further heat (dry heat)-set at 245° C. for 2 minutes;

The curve IV is a stress-strain curve of the yarn used in the curve V, except it has been covered with cotton fibres.

Referring to the drawing, the original yarn [I] shows a sudden increase of a stress up to the first yield point $Y_1$, which in turn drops, then increases gradually up to the break point of 140%. On the other hand, the yarns of II to VI lose their extensibility extremely according to their thermal memories. It is noted that the original yarn [I] only retains an elongation of about 30% after it has heat-set at 245° C. for 2 minutes which condition is practically employed at the time of dip treatment, and this yarn of about 30% break elongation is subjected to the actual tire building as the weft. Therefore, said yarn is still incapable of conforming to the expansion of 60% to 80% in a carcass portion and breaks unevenly during said expansion of the carcass.

As is apparent from the drawing, the core spun yarn (VI) shows slightly different behavior from that of the non-covered yarn I to V. Namely, the covered yarn presents a comparatively high yield point attributed to the tenacity of the cotton yarn. After said point, however, the stress drops temporarily then increases again. Since this increasing stress is developed by the core filaments, the covered yarn still breaks at point $E_1$ which is less than 40% in elongation of break. Therefore, the breakage of weft yarns can not be avoided even if said covered yarns are adopted as the weft components.

As mentioned above, it is easily understood that those skilled in the art find many difficulties to produce a tire of high quality by maintaining the original break elongation of weft components used in a tire cord fabric throughout the tire shaping process.

SUMMARY OF THE INVENTION

Accordingly, the present invention seeks to provide a thermally stable filamentary yarn useful for the weft component of a tire cord fabric to enable uniform tire-shaping wherein the yarn is capable of withstanding a severe heat-treatment during dipping process and retains its original break elongation substantially even after said heat-treatment.

The invention also seeks to provide a filamentary yarn for the weft component which can retain its original break elongation even after it is heat-treated at 245° C. for 2 minutes.

Further, the invention seeks to provide a filamentary yarn having thermal stability as mentioned above by the use of a simple and practical means.

The present invention is based on the discovery of a surprising and peculiar phenomena that the modified polyester yarn made by incorporating a small quantity of polymer having a higher glass transition temperature than that of said polyester into said polyester yarn, especially, with a break elongation of at least 70% almost retains its original elongation even after it is heat-treated at a thermally severe condition.

Thus, according to the invention there is provided a filamentary yarn useful for the weft component of a tire fabric, the yarn being made of a blend of [A] a polyester having ethylene terephthalate units as the main repeating unit structure and [B] a melt spinnable polymer having a glass transition temperature of at least 10° C. higher than that of the polymer [A] wherein the amount of the polymer [B] present in the yarn being in the range of 0.5% to 15% by weight whereby the yarn is characterized by possessing the properties of:

(a) a break elongation [DE] of 70% to 200%,
(b) a dry heat shrinkage [DHS] of +5% to −2% at 150° C. for 30 minutes and
(c) a residual elongation [DEA] of more than 60% after the yarn is freely heat-relaxed at 245° C. for 2 minutes.

Further, there is also provided a tire cord fabric which comprises warp yarns forming warp cords, and weft yarns, the weft yarns being a twist of a filamentary yarn made of a blend of [A] a polyester having ethylene terephthalate units as the main repeating unit structure and [B] a melt spinnable polymer having a glass transition temperature of at least 10° C. higher than that of the polymer [A] wherein the amount of the polymer [B] present in the yarn being in the range of 0.5% to 15% by weight whereby the yarn is characterized by possessing the properties of:

(a) a break elongation [DE] of 70% to 200%,
(b) a dry heat shrinkage [DHS] of +5% to −2% at 150° C. for 30 minutes and
(c) a residual elongation [DEA] of more than 60% after the yarn is freely heat-relaxed at 245° C. for 2 minutes.

In this regard, the inventors have found that when a filamentary yarn made up of polyethyleneterephthalate includes up to 15%, by weight, of a polymer having a glass transition temperature of at least 10° C. higher than that of polyethyleneterephthalate, the yarn is capable of withstanding the severe thermal treatment of 245° C. for 2 minutes, maintaining more than 85% of the original elongation and thus, the yarn can be used as the weft component of a tire cord fabric since it is thermally stable during heat-treatment.

DETAILED DISCLOSURE

As polymer [A], polyethyleneterephthalate is mainly employed in the present invention, however, said terephthalate may be modified by adding or incorporating dicarboxylic acids and/or dioxy compounds up to 15 mole percent as the third component or any additives common to those in the art. In this case, the inherent viscosity of polymer [A] is rather important, and generally speaking it may preferably have a viscosity of more than 0.5. A filamentary yarn melt spun from a blend of such polymers exhibits an improved thermal property regarding the retention of break elongation.

On the while, polycarbonate or polyalkylenenaphthalate is the typical example of polymer [B]. Especially, polycarbonate manufactured by mean of Ester-interchange method or Phosgen method which are widely known in this field is preferably employed in the invention. As dioxy compounds constituting a part of said polymer, following can be cited:

4,4'-dihydroxydiphenyl-1,1-ethane (130° C.), 4,4'-dihydroxydiphenyl-1,1-butane (123° C.), 4,4'-dihydroxydiphenyl-1,-isobutane (149° C.) , 4,4'-dihydroxydiphenyl-2,2-propane (149° C.), 4,4'-dihydroxydiphenyl-2,2-butane (134° C.), 4,4'-dihydroxydiphenyl-2,2-pentane (137° C.), 4,4'-dihydroxydiphenyl-4,4-heptane (148° C.), 4,4'-dihydroxydiphenyl-phenylmethylmethane (176° C.), 4,4'-dihydroxydiphenyl-diphenylmethane (121° C.), 4,4'-dihydroxydiphenyl-1,1-cyclopentane (167° C.), 4,4'-dihydroxy-3,3'-dichlorodiphenyl-2,2-propane (147° C.), 4,4'-dihydroxy-3,3'-5,5'-tetrachlorodiphenyl-2,2-propane (180° C.).

In the above, the temperatures indicated in parentheses are glass transition temperature of a polymer derived from each of dihydroxy compounds.

Among polycarbonates mentioned above, a polycarbonate derived from bis-phenol A (4,4'-dihydroxydiphenyl-2,2-propane) as dihydroxy compound can be preferably applicable. Generally, polycarbonates having a melt index of 5 to 20 is preferred.

As to polyalkylene naphthalate, polyethylene-2,6-naphthalate with a glass transition temperature of about 120° C. is preferably used, and the polymerization thereof can be carried out by method described in Japanese Patent Publication Nos. 1957/1974, 19715/1975, Japanese Laid-Open Nos. 96693/1973 and 67393/1975.

It is important how to blend and melt-spin said naphthalate together with polyethylene terephthalate. From this point of view, naphthalate polymers having a average molecular weight of 15,000 to 35,000, corresponding to a value of 1300 to 6000 poise in melt index, is preferably adapted.

Now, it has been found that an amount of polymer [B] to be added is quite critical to prevent the elongation drop of polyethylene terephthalate yarn after the heat-relaxation of 245° C. for 2 minutes. When polymer [B] is added to polymer [A] exceeding certain upper limit, polyethylene terephthalate yarn {made up of polymer [A]} tends to decrease in its thermal stability to be improved, thus, significance of use of polymer [B] is denied. On the other hand, when polymer [B] is used too small the yarn is never improved in it thermal stability. In this sense, polymer [B] should be present in an amount of 0.5% to 15% by weight of total polymers.

A melt-spinning of a blend of polymer [A] and [B] may be carried out by blend-spinning techniques well known in the art, one of which is explained below:

(1) Firstly, feeding 99.5 to 85 parts by weight of polymer [A] and 0.5 to 15 parts by weight of polymer [B] to an extruder;
(2) Secondly, mixing and melting both polymers and, consequently extruding the melt through a spinneret and winding a spun-filaments at a high speed of more than 2,000 m/min., preferably 2,500 m/min. so that the finally wound filaments is imparted an elongation at break of 70% to 200%.

Alternately, a undrawn filaments spun at a winding speed of less than 2,000/m/min., especially 800 m/min. to 1,500 m/min. are prepared and then said filaments are drawn at a lower draw ratio of 1.3 to 3.0 to give a drawn an elongation at break of 70% to 200%. In the above spinning process, it is important to adjust the elongation of a finally wound yarn in a half-drawn or partially oriented state to the limited range of 70% to 200%, which in turn corresponds to a birefringence value of 0.025 to 0.12. As a thermal property of such a yarn to be noted, it substantially shows non-variance of the elongation even after heat-relaxation of 245° C. for 2 minutes.

On the while, a sequential change at the ambient temperature of the filamentary yarn, as the time goes on, is unavoidable, resulting a width variance of a wire cord fabric when said yarn is used as the weft component. In order to overcome such a defect and to secure a dimensional stability at ambient temperature, a measure of "dry heat shrinkage" at 150° C. for 30 minutes is applied. When a filamentary yarn have said dry heat shrinkage of +5% to −2%, its dimensional stability at ambient temperature becomes satisfactory.

For this improvement, the melt spun filamentary yarn (POY) which has the dry heat shrinkage of about 40% to 50% is re-wound on a cylinder twisting the same to 10 turns/meter to 130 turns/meter which is necessary for cohesion of the weft component and then steam set for 120° C. to 160° C. for 1 minutes to 90 minutes whereby said melt spun yarn is given the dry heat shrinkage of +5% to −2% and becomes stable dimensionally at ambient temperature. Another means comprise advancing the spun yarn through a boiling bath for a few minutes, or through a heated atmosphere maintained at a temperature of 100° C. to 180° C. (dry bulb) for a time of less than 60 seconds. Further, in case of a filamentary yarn which is obtained by at a lower winding (spinning) speed and a lower draw ratio as mentioned before, the dry heat shrinkage of the same may be adjusted during the drawing process or in a subsequent heat setting process.

Thus steam (heat) treated yarns with the dry heat shrinkage of +5% to −2% substantially retain the original elongation of 70% to 200%, therefore, it is quite ideal for use as the weft component of a tire cord fabric. Since a tire cord fabric comprising said heat-treated yarns as the weft component is much stable at room temperature, it never cause the problem of a width variance of the fabric due to an irregular shrinkage of the weft yarns, and as a result, the warp yarns are kept at a equi-distance relation.

Still the weft yarn can retain their original elongation even after the fabric comprising the same is dipped. This means each of the weft yarns expand uniformly to a toroidal shape to give a high quality to the shaped tire in which the warp yarn are retained at an equi-distance. Therefore, the fabric functions well as the carcass of a monoply radial tire.

The limited range of break elongation, say, 70% to 200% preferably 80% to 150% defined in the invention is fairly critical. When the elongation is less than 70%, it easily decreases to less than 60% after dip treatment especially at 240° C. In this case, the weft yarn is insufficient to break in their elongation during tire shaping. On the other hand, the elongation (of the weft yarns) exceeds 200%, the weft yarns show unnecessary extension which causes, in turn, an irregular distribution or displacement of the warp yarns.

Normally, the filamentary yarns prepared in a spinning or drawing step for use as the weft component has a fineness of 75 denier to 200 denier. These yarns having an break elongation of 70% to 200% and a dry heat shrinkage of about 40% to 50% are twisted to a degree of 10 turns/meter to 130 turns/meters on a cylinder, and then steam set to obtain the heat-set yarn with the dry heat shrinkage of +5% to −2%. The steam-set yarns are then subjected to a weaving process as the weft component. The warp cords used in this process may be any type of synthetic fibre having high tenacity. Typical example of these are polyesters, polyamides and polypropylenes. These yarn preferably have a tenacity of at least 80 grams/denier and a break elongation of 10% to 40%.

Prior to dipping process, a tire cord fabric is generally subjected to a crazing process. This crazing aims at producing physical softening or flexibility in the tire cord fabric, during which process the weft yarns are apt to slide along the warp yarns. In order to avoid such irregularity, it is preferable to coat said cylinder set yarns with rubbery latex. The application of said latex may be carried out by dipping said yarn of a twisted state into a latex bath or advancing the yarn in contact with the surface of a rotating roller immersed in a bath containing the latex. The reasonable weight of the latex applied to the yarn is from 0.3% to 3.0% by weight of the yarn. By this treatment, the yarns are given sufficient ability to resist slippage. The latices for use in the invention are generally well known. Examples are styrene-butadiene rubber latex, vinyl-pyridine latex, nitril latex or natural rubber latex. In addition to the above, epoxylated latices, such as epoxylated polybutadiene, epoxylated styrene-butadiene copolymer and epoxylated nitril butadiene copolymer are preferably adopted when one expects firm binding function.

The latex treated yarn for use as the weft component presents an additional merit in case of using it in the form of cotton covered yarn (corespun yarn). In this case, said latex treated yarn enables to cover cotton fibres uniformly around it. Heretofore it has been quite difficult to cover cotton fibres uniformly around a filamentary yarn as the latter is much slippery. Due to the slippage between cotton fibres and the core yarn, a corespun yarn obtained often shows wrapping irregularity which causes a displacement of warp yarns in a tire cord fabric.

On the other hand, the latex-treated weft yarn in the invention has a high friction coefficient, therefore, uniform and stable wrapping effect can be expected, avoiding the displacement of warp yarns. Cotton fibres may be covered completely or spaced at regular intervals around the core. Considering an adhesion effect between the warp and the weft after dip treatment, the latter is preferable. Namely, a weft yarn obtained by the spaced covering with cotton fibre produces, due to its variance in thickness, minute gaps at its cross contacting portions with a warp, which gaps then allow an improved degree of penetration of adhesive thereinto. To produce such gaps, it is appropriate to maintain a covering ratio in the range of 20% to The covering ratio is expressed by the formula:

$$\text{Covering ratio (\%)} = \frac{\text{surface area wound with cotton fibres}}{\text{total surface area of a weft yarn}} \times 100$$

Generally, "cotton fibre" used in the invention may be in the form of sliver or spun yarn, and a total denier thereof is preferably the same as that of the core yarn, or slightly less.

Thus, according to the present invention a filamentary yarn useful for the weft component of a tire cord fabric is provided by a simple process, namely a blend spinning technique, and said yarn can retain its original elongation even after heat-curing at a temperature of more than 245° C. during tire building process. Since the yarn decreased in its dry heat shrinkage prevents the width irregularity of a tire cord fabric when used as the weft component in said fabric, a tire of high quality can be produced.

Still, a tire cord fabric of the present invention is preferably applicable as the carcass of a monoply in view of these days-severe requirement of firm bonding between rubber and fibre at the carcass portion of a radical tire.

The invention will be further illustrated by way of examples. Elongation (DE) and dry heat shrinkage (DHS) used hereinafter are defined as follows:

(1) DE

Using a "Autograph Type-III" made by Toyo Sokki K.K., a sample yarn of 20 cm length is strained at a speed of 100%/minute until the yarn is broken, and E in centimeter is read which corresponds to the maximum stress at the time of yarn breakage.

Thus, DE is determined from the formula:

$$DE = \frac{E}{20} \times 100 \, (\%)$$

(2) DHS

A load of 1/30 grams/denier is suspended at one end of a sample yarn, and in this state the yarn is marked at intervals of 100 cm. Then, the yarn is converted into a hank of 20 cm length and heat treated at 150° C. (dry bulb) for 30 minutes. After cooled to the room temperature, a length (L) between the adjacent marked points is measured under a load of 1/30 grams/denier. DHS is determined by the formula:

$$DHS = 100 - L \, (\%)$$

EXAMPLE 1

Various polymers as shown in Table-I are melted at 295° C. and extruded through a spinneret. The extruded filaments are then wound as a partially oriented yarn (POY). The yarn is further rewound on a cylinder, twisting it to 100 turns/meter and in this state steam-set at 135° C. for 30 minutes. The steam-set yarn is further heat relaxed at various conditions, namely (a) 150° C.×30 minutes, (b) 230° C.×2 minutes, (c) 240° C.×2 minutes and (d) 245° C.×2 minutes. Each of the heat-relaxed yarns have DE and DHS as shown in Table-II.

TABLE I

| Run No. | Polymer [A] Composition | [η] | Polymer [B] Composition | [η] | Blend ratio [A]:[B] | Winding speed (m/min.) | Wound yarn (de/fil) |
|---|---|---|---|---|---|---|---|
| 1 | 99.7 parts of PET* and 0.3 part of TiO$_2$ | 0.72 | — | — | — | 2800 | 150/36 |
| 2 | 99.7 parts of PET* and 0.3 part of TiO$_2$ | 0.72 | — | — | — | 2800 | 150/72 |
| 3 | 99.7 parts of PET* and 0.3 part of TiO$_2$ | 0.72 | — | — | — | 3100 | " |
| 4 | 99.7 parts of PET* and 0.3 part of TiO$_2$ | 0.72 | — | — | — | 2800 | 115/36 |
| 5 | 99.7 parts of PET* and 0.3 part of TiO$_2$ | 0.64 | P.C* | | 95:5 | 2500 | 150/48 |
| 6 | 99.7 parts of PET* and 0.3 part of TiO$_2$ | 0.64 | " | | " | 3000 | " |
| 7 | 99.7 parts of PET* and 0.3 part of TiO$_2$ | 0.64 | " | | " | 3500 | " |
| 8 | 99.7 parts of PET* and 0.3 part of TiO$_2$ | 0.64 | — | — | — | 3300 | " |
| 9 | 99.7 parts of PET* and 0.3 part of TiO$_2$ | 0.64 | — | — | — | 3300 | 115/36 |

PET ... Polyethylene terephthalate
P.C ... Polycarbonate

TABLE II

| Run No. | Spun Yarn DHS (%) | Spun Yarn DE$_1$ (%) | Condition a DHS (%) | Condition a DE$_2$ (%) | Condition b DHS (%) | Condition b DE$_3$ (%) | Condition c DHS (%) | Condition c DE$_4$ (%) | Condition d DHS (%) | Condition d DEA (%) |
|---|---|---|---|---|---|---|---|---|---|---|
| 1 | — | 144 | 0.5 | 136 | 1.3 | 102 | 3.6 | 80 | 4.4 | 36 |
| 2 | — | 128 | 0.6 | 114 | 1.4 | 89 | 3.7 | 62 | 4.5 | 35 |
| 3 | — | 110 | 0.7 | 96 | 1.2 | 78 | 3.7 | 51 | 4.6 | 26 |
| 4 | — | 141 | 0.5 | 120 | 1.5 | 93 | 3.6 | 72 | 4.3 | 38 |
| 5 | 63 | 154 | 0.4 | 141 | 2.2 | 133 | 4.5 | 131 | 5.0 | 135 |
| 6 | 58 | 128 | 0.4 | 116 | 2.1 | 115 | 4.3 | 112 | 5.3 | 112 |
| 7 | 56 | 106 | 0.5 | 99 | 2.3 | 96 | 3.3 | 94 | 4.5 | 91 |
| 8 | 73 | 134 | 0.3 | 112 | 1.5 | 63 | 3.2 | 35 | 4.5 | 18 |
| 9 | 63 | 124 | 0.4 | 108 | 1.6 | 61 | 3.6 | 37 | 4.8 | 16 |

In the above tables, Run No. 1–4 are comparative examples wherein PET alone, of a higher inherent viscosity, is melt spun, Run No. 5–7 are examples of the present invention and Run No. 8–9 are comparative examples by way of a conventional POY.

It can be observed through the experiments that there is not considerable worth-while difference among Run No. 1–9 so far as the test are carried out under condition (b), namely, heat relaxation at 230° C. for 2 minutes. As a general tendency, Run No. 5–7 are the best, Run No. 1–4 are next and Run No. 8–9 come last.

On the other hand, there occurs a considerable worth-while difference among the above mentioned three groups when the tests are carried out under condition (d) which is more severe than condition (b). Namely, the steam-set yarns of Run No. 5–7 retain substantially their original elongation even after heat-relaxed at condition (a), while the other steam-set yarns of Run No. 1–4 or Run No. 8–9 lose their elongation to a level of less than 40%. These thermally degraded yarns, when used as the weft component of a tire cord fabric, breaks themselves, thus finding their practical use no longer. Comparing Run No. 1–4 and Run No. 8–9, it can be seen that the former group shows more superior values regarding the elongation maintaining ratio [M]. This is due to the difference of inherent viscosity [η] between the polymers.

For reference, said [M] is calculated for each of the heat-relaxed yarns the results of which are shown in Table-III. From the data, the function of polycarbonate is well understood.

TABLE III

| Run No. | [M] (%) |
|---|---|
| 1 | 26.5 |
| 2 | 30.7 |
| 3 | 27.1 |

EXAMPLE 2

Experiments are carried out in the same manner as in Example 1, except that a blend ratio of polymer [A] and [B] is varied. The elongation properties of the yarns obtained are shown in Table-IV.

Other conditions are as follows:

| (1) | Polymer melting temperature | 287° C. |
|---|---|---|
| (2) | Winding speed | 3500 m/min |
| (3) | Fineness of spun yarn | 150 de/48 fil |
| (4) | PET Inherent viscosity [η] = 0.64 | |
| (5) | PC | 0.3 weight percent of $TiO_2$ is added based on the total amount. L-1250 (Trade name; TEIJIN KASEI KK). |

TABLE IV

| Run No. | Blend ratio A:B | Condition a $DE_2$ | Condition b (%) | Condition c (%) | Condition d (%) | [M] (%) |
|---|---|---|---|---|---|---|
| 10 | 99.8:0.2 | 115 | 65 | 39 | 22 | 19 |
| 11 | 99.5:0.5 | 111 | 99 | 97 | 95 | 86 |
| 12 | 99:1.0 | 108 | 101 | 96 | 95 | 88 |
| 13 | 98:2.0 | 102 | 96 | 94 | 94 | 92 |
| 14 | 95:5.0 | 103 | 98 | 96 | 95 | 92 |
| 15 | 93:7.0 | 101 | 96 | 94 | 93 | 91 |
| 16 | 88.5:11.5 | 106 | 101 | 96 | 93 | 88 |
| 17 | 85:15.0 | 100 | 93 | 89 | 86 | 86 |
| 18 | 82:18.0 | 97 | 78 | 72 | 70 | 72 |

From the above examples, it can be concluded that an increase in weight of polycarbonate generally improves [M] properties in the spun yarns, however, 0.5 to 15 wt % of polycarbonate blending is necessary in order to obtain yarns which withstand the heat-treatment under condition (d) and correspondingly, elongate without breakage during tire building process. On the while, the blend ratio of PC more than 15 wt % causes a drop of the melting and softening points of PET to result in the decrease in thermal stability of PET yarn. Also, no expected effects or improvements cannot be obtained under the blend ratio of PC less than 5 wt %.

EXAMPLE 3

According to example 1, a polyethylene-2,6-naphthalate (referred to as "PEN" hereinafter) having an inherent viscosity of 0.62 is blended with a polyethylene terephthalate polymer listed as Run No. 5 in Table-I. The thermal characteristics of the yarn obtained are shown in Table-V.

TABLE V

| Run No. | Blend ratio (A:B) | Winding speed (m/min) | Wound yarns (de/fil) | Spun yarn $DE_1$ (%) | Condition a DHS (%) | Condition a $DE_2$ (%) | Condition b $DE_3$ (%) | Condition c $DE_4$ (%) | Condition d DEA (%) | [M] (%) |
|---|---|---|---|---|---|---|---|---|---|---|
| 19 | 99.8:0.2 | 3000 | 150/48 | 132 | less than 1% | 118 | 72 | 49 | 35 | 30 |
| 20 | 99.5:0.5 | " | " | 128 | less than 1% | 114 | 101 | 98 | 97 | 85 |
| 21 | 99:1.0 | " | " | 131 | less than 1% | 121 | 114 | 110 | 110 | 91 |
| 22 | 98:2.0 | " | " | 127 | less than 1% | 115 | 112 | 111 | 109 | 95 |
| 23 | 95:5.0 | " | " | 129 | less than 1% | 117 | 113 | 109 | 110 | 94 |
| 24 | 91.5:8.5 | " | " | 128 | less than 1% | 116 | 111 | 112 | 112 | 97 |
| 25 | 88.5:11.5 | 3500 | " | 106 | less than 1% | 98 | 95 | 95 | 93 | 95 |
| 26 | 86.5:13.5 | 3000 | " | 130 | less than 1% | 119 | 107 | 105 | 103 | 87 |
| 27 | 86.5:15.0 | " | " | 125 | less than 1% | 114 | 102 | 100 | 98 | 86 |
| 28 | 82:18.0 | " | " | 132 | less than | 122 | 30 | — | — | — |

TABLE V-continued

| Run No. | Blend ratio (A:B) | Winding speed (m/min) | Wound yarns (de/fil) | Spun yarn DE₁ (%) | Condition a DHS (%) | DE₂ (%) | Condition b DE₃ (%) | Condition c DE₄ (%) | Condition d DEA (%) | [M] (%) |
|---|---|---|---|---|---|---|---|---|---|---|
| | | | | | 1% | | | | | |

The same results are obtained in the examples as that of Table-II–III in Example 1. Namely, PEN presents the same function as polycarbonate does regarding the thermal improvement of PET.

As is clear from Table-V, 0.5 wt % to 15 wt % of PEN blending enables PET yarns to maintain [M] value of more than 85% as a result of withstanding the heat-treatment at 245° C. for 2 minutes. On the while, 18 wt % of PEN blending causes the lowering of a melting point of PET and thus the PET yarns lose their thermal stability. Also, less amount of PEN such as 0.2 wt % renders little effects.

EXAMPLE 4

Four types of tire cord fabrics are produced using the steam-set yarns, as the weft component, of Run No. 1 (comparative example), Run No. 6 (the invention), Run No. 8 (comparative example), in Table-II (Example 1), and Run No. 24 the invention in Table-V (Example 3). Other conditions are as follows:

| (1) | Warp cord: | plies of polyethylene terephthalate yarn of 1800 de/ .250 fil. (Tenacity of 8.5 grams/de) |
|---|---|---|
| (2) | End count: | 55/5 cm |
| (3) | Pick count: | 2/inch |

Each of fabrics are passed through a resorcinolformaldehyde latex solution wherein the solid component adheres to the fabric at a pick-up ratio of 6% by weight of the fabric, and dried at 150° C. for 4 minutes and then heat-set for curing the adhesive at 245° C. for 2 minutes.

Using said heat-set fabrics in the form of a singleply for the carcass and a further steel belt with a construction of 1×5×0.25, 30 ends/5 cm, in 2 plies in a tread portion, radial tires (green tire) are built.

In Table-VI below are shown tire performance and behavior of the weft yarns.

TABLE VI

| Items | Run No. 1 | Run No. 6 | Run No. 8 | Run No. 24 |
|---|---|---|---|---|
| Breakage of the weft yarns: | Randomly broken | None | Randomly broken | None |
| Distribution of the warp cords: | Frequently displaced due to the breakage of the weft yarns | Fairly even | Frequently displaced due to the breakage of the weft yarn | Fairly even |
| Tire uniformity (Radial force variation): | Bad | Good | Bad | Good |
| Irregularities in side walls: | Yes | None | Yes | None |

Also, the as-spun yarn without the steam-setting in Run No. 6 or 8 is used as the wefts component to produce a tire cord fabric. In this case, the dry heat shrinkage DHS is beyond 5%. When the fabric is stored for 3 day at the room temperature, it carries the width-irregularities along the weft yarns. This is due to the higher value of DHS of the as-spun yarn and accordingly, said yarn is sequentially unstable even at room temperature. Further such fabric are passed through a resorcinol-formaldehyde latex solution, and dried at 150° C. for 4 minutes. Thus treated fabric shows a random displacement of the warp yarn due to irrgular shrinkage of the weft yarn. Therefore, a filamentary yarn for use as the weft component should have DHS value of 5% to −2%.

EXAMPLE 5

A blend of 92 parts by weight of a polyethylene terephthalate polymer with an inherent viscosity of 0.64 in the form of chips and containing 0.3 parts by weight of $TiO_2$ and 8.0 parts by weight of a polycarbonate polymer (chip) having a melt index (MI) of 12 are melted. The melt composition is then extruded through a spinneret having 48 holes, each having a diameter 0.25 mm, and wound at 1200 m/min. Thus obtained undrawn yarn of 375 de/48 fil has a break elongation of 430%.

Next, said undrawn yarn is drawn through a bath containing hot water heated to 90° C. at a draw ratio of 2.5 to produce a drawn yarn of 153 de/48 fil having an break elongation of 112%, DHS of 69% and a tenacity of 360 grams. This drawn yarn is heat-set in tensioned state at 130° C. (dry bulb) for 20 minutes. In Table-VII below are shown thermal characteristics of the steam-set yarn reduced in its DHS when it is heat-relaxed at conditions (a), (b), (c) and (d), in dependently.

TABLE VII

| Condition a | | Condition b | | Condition c | | Condition d | | |
|---|---|---|---|---|---|---|---|---|
| DHS (%) | DE₂ (%) | DHS (%) | DE₃ (%) | DHS (%) | DE₄ (%) | DHS (%) | DEA (%) | [M] (%) |
| 0.6 | 109 | 0.8 | 105 | 2.6 | 104 | 4 | 102 | 94 |

What is claimed is:

1. A filamentary yarn useful for the weft component of a tire cord fabric, the yarn being made of a blend of [A] a polyester having ethylene terephthalate units as the main repeating unit structure and [B] a melt spinnable polymer of polyethylene 2,6-naphthalate having a glass transition temperature of at least 10° C. higher than that of the polymer [A] wherein the amount of the polymer [B] present in the yarn being in the range of 0.5% to 15% by weight whereby the yarn is characterized by possessing the properties of:
    (a) a break elongation [DE] of 70% to 200%,
    (b) a dry heat shrinkage [DHS] of +5% to −2%, at 150° C. for 30 minutes and
    (c) a residual elongation [DEA] of more than 60% after the yarn is freely heat-relaxed at 245° C. for 2 minutes.

2. The filamentary yarn according to claim 1, in which said yarn shows an elongation maintaining ratio [M] of more than 85% wherein said [M] is determined by the following formula:

$$\text{Elongation maintaining ratio } [M] = \frac{[DEA]}{[DE]} \times 100 \, (\%).$$

3. The filamentary yarn according to claim 1, in which said yarn has a break elongation [DE] of 80% to 150%.

4. The filamentary yarn according to claim 1, in which said yarn has a residual elongation [DEA] of 70% to 100%.

5. The filamentary yarn according to claim 1, in which said yarn has a dry heat shrinkage [DHS] of 0% to 2%.

6. The filamentary yarn according to claim 1, in which said polyester [A] has an inherent viscosity of 0.5 to 0.95 as measured in a 60/40 ortho-chlorphenol/tetrachloroethane mixed solvent at 30° C.

7. The filamentary yarn according to claim 1, in which said polymer [B] has a glass transition temperature of at least 20° C. higher than that of the polyester [A].

8. The filamentary yarn according to claim 1, in which the amount of the polymer [B] present in the yarn is in the range of 0.5% to 5% by weight.

9. A tire cord fabric which comprises warp yarns forming warp cords, and weft yarns, the weft yarns being a twist of a filamentary yarn made of a blend of [A] a polyester having ethylene terephthalate units as the main repeating unit structure and [B] a melt spinnable polymer of polyethylene 2,6-naphthalate having a glass transition temperature of at least 10° C. higher than that of the polymer [B] wherein the amount of the polymer [B] present in the yarn being in the range of 0.5% to 15% by weight whereby the yarn is characterized by possessing the properties of:
  (a) a break elongation [DE] of 70% to 200%,
  (b) a dry heat shrinkage [DHS] of +5% to −2%, at 150° C. for 30 minutes and
  (c) a residual elongation [DEA] of more than 60% after the yarn is freely heat-relaxed at 245° C. for 2 minutes.

10. The tire cord fabric according to claim 9, in which said twist has 10 to 130 turns per meter.

11. The tire cord fabric according to claim 9 or 10, in which said weft yarn is covered by cotton fibres.

* * * * *